United States Patent
Roberts et al.

(10) Patent No.: US 9,642,145 B2
(45) Date of Patent: May 2, 2017

(54) METHODS AND APPARATUSES FOR DYNAMIC BACKHAUL BANDWIDTH MANAGEMENT IN WIRELESS NETWORKS

(71) Applicant: Calix, Inc., Petaluma, CA (US)

(72) Inventors: Harold Roberts, Petaluma, CA (US); Steve Timm, Petaluma, CA (US); Berkay Baykal, Petaluma, CA (US)

(73) Assignee: Calix, Inc., Petaluma, CA (US)

( * ) Notice: Subject to any disclaimer, the term of this patent is extended or adjusted under 35 U.S.C. 154(b) by 718 days.

(21) Appl. No.: 13/889,078

(22) Filed: May 7, 2013

(65) Prior Publication Data
US 2014/0335877 A1 Nov. 13, 2014

(51) Int. Cl.
*H04W 72/00* (2009.01)
*H04W 72/04* (2009.01)

(52) U.S. Cl.
CPC ............................... *H04W 72/0486* (2013.01)

(58) Field of Classification Search
CPC ..... H04W 24/00; H04W 88/14; H04W 88/08; H04W 28/08; H04W 28/04; H04W 72/0446; H04W 80/04; H04L 47/10; H04L 12/5695; H04B 1/56
USPC .................. 455/452.1, 452.2, 560, 561, 453; 370/235, 280, 329, 468, 230, 236.1, 336, 370/328
See application file for complete search history.

(56) References Cited

U.S. PATENT DOCUMENTS

| | | | |
|---|---|---|---|
| 2003/0002529 A1* | 1/2003 | Gibbons | H04L 12/14 370/468 |
| 2006/0115271 A1* | 6/2006 | Hwang | H04J 14/0226 398/72 |
| 2006/0153233 A1* | 7/2006 | Chen | H04L 12/5695 370/468 |
| 2009/0070694 A1* | 3/2009 | Ore | H04W 12/08 715/764 |
| 2011/0191482 A1* | 8/2011 | Przybysz | H04L 12/14 709/228 |

(Continued)

*Primary Examiner* — Charles Appiah
*Assistant Examiner* — Alexander Yi
(74) *Attorney, Agent, or Firm* — Schwegman Lundberg & Woessner, P.A.

(57) ABSTRACT

Techniques for dynamic backhaul bandwidth provisioning are described herein. For example, a method may include determining a potential subscriber user equipment load change, transmitting a backhaul bandwidth change request message based a potential subscriber UE load change, wherein the backhaul bandwidth change request message includes a requested backhaul bandwidth level, receiving a backhaul bandwidth change reply message in response to transmitting the backhaul bandwidth change request message, implementing a subscriber UE load change response corresponding to the potential subscriber UE load change based on receiving the backhaul bandwidth change reply message. Further example methods disclosed may include receiving a backhaul bandwidth change request message, wherein the backhaul bandwidth change request message includes a requested backhaul bandwidth level, calculating an available backhaul bandwidth level corresponding to a backhaul, transmitting a backhaul bandwidth change acknowledgement message when the available backhaul bandwidth level supports the requested backhaul bandwidth level.

17 Claims, 7 Drawing Sheets

(56) References Cited

U.S. PATENT DOCUMENTS

| | | | |
|---|---|---|---|
| 2013/0115888 A1* | 5/2013 | Tipton | H04B 17/26 455/67.11 |
| 2013/0155965 A1* | 6/2013 | Koodli | H04W 4/021 370/329 |
| 2014/0003451 A1* | 1/2014 | Wagh | H04L 41/0896 370/468 |
| 2015/0373672 A1* | 12/2015 | Forssell | H04L 47/76 370/329 |

* cited by examiner

METHODS AND APPARATUSES FOR DYNAMIC BACKHAUL BANDWIDTH MANAGEMENT IN WIRELESS NETWORKS

TECHNICAL FIELD

This disclosure relates generally to wireless communications and in particular to methods and apparatuses for backhaul management.

BACKGROUND

To provide wireless services to one or more mobile devices, wireless network access points in legacy wireless networks communicate with a core network (e.g. the Internet, Public Switch Telephone Network (PSTN), etc.) via a wired communication link, which is often called a "backhaul." In most networks, these backhauls possess constant capacity that does not vary over time, unlike over-the-air communication links, whose data rate and general communication quality vary greatly over time and space, depending on path loss, fading, and interference between the access point and a given mobile device, or "user equipment" (UE), to which the access point provides wireless communication services.

Wireless communication service providers provision backhaul bandwidth capacity conservatively, such as based on the theoretical maximum amount of bandwidth required for a subscriber load. However, because network conditions rarely, if ever, reach the theoretical maximum load, available and unused backhaul bandwidth is typically available for use but may not be provisioned to potential additional service providers because the unused backhaul bandwidth is already provisioned for existing providers.

This static backhaul bandwidth provisioning effectively limits the number of access points that a backhaul provider can support, causing the backhaul provider to charge more for remaining unused bandwidth, or the wireless communication provider to install more access points to support all potential subscriber UEs.

SUMMARY

As described above, static backhaul bandwidth provisioning effectively limits the number of access points that a backhaul provider can support, which may result in the backhaul provider charging more for the remaining unused bandwidth, or for the wireless communication provider to install more access points to support all potential subscriber UEs. Hence, there exists a need for improved backhaul bandwidth provisioning by backhaul service providers to enable these service providers to increase their revenue by supporting more stations on a given bandwidth and to limit wireless service providers' costs by minimizing capital expenditures corresponding to installing additional access points.

In general, this disclosure describes techniques for dynamic backhaul bandwidth provisioning. Using various techniques of this disclosure, an access point may determine that more backhaul bandwidth may be needed to support an additional bandwidth request from a currently serviced UE or to accept a new UE that has requested service from the access point. The access point may then dynamically request the additional bandwidth needed and a bandwidth provisioning manager in a backhaul network entity may determine whether the backhaul can support the requested additional bandwidth. Based on this determination, the backhaul provisioning manager may approve or deny the additional bandwidth request dynamically—allowing more access points (and associated UEs) to operate using the backhaul and reducing the amount of access points needed by a wireless access network to support a given bandwidth load.

In one example, this disclosure is directed to a method of backhaul bandwidth management executed by a computing device. The method comprises determining a potential subscriber user equipment load change, transmitting a backhaul bandwidth change request message based on determining the potential subscriber UE load change, wherein the backhaul bandwidth change request message includes a requested backhaul bandwidth level, receiving a backhaul bandwidth change reply message in response to transmitting the backhaul bandwidth change request message, and implementing a subscriber UE load change response corresponding to the potential subscriber UE load change based on receiving the backhaul bandwidth change reply message.

In another example, this disclosure is directed to an apparatus for backhaul bandwidth management. The apparatus comprises a potential subscriber load change determining module configured to determine a potential subscriber user equipment load change, a backhaul bandwidth change request transmitting module configured to transmit a backhaul bandwidth change request message based on determining the potential subscriber UE load change, wherein the backhaul bandwidth change request message includes a requested backhaul bandwidth level, a backhaul bandwidth change reply message receiving module configured to receive a backhaul bandwidth change reply message in response to transmitting the backhaul bandwidth change request message, and a subscriber load change response implementing module configured to implement a subscriber UE load change response corresponding to the potential subscriber UE load change based on receiving the backhaul bandwidth change reply message.

In another example, this disclosure is directed to at least one machine readable medium for dynamic backhaul bandwidth management, comprising a plurality of instructions that in response to being executed on a computing device, cause the computing device to determine a potential subscriber user equipment load change, transmit a backhaul bandwidth change request message based on determining the potential subscriber UE load change, wherein the backhaul bandwidth change request message includes a requested backhaul bandwidth level, receive a backhaul bandwidth change reply message in response to transmitting the backhaul bandwidth change request message, and implement a subscriber UE load change response corresponding to the potential subscriber UE load change based on receiving the backhaul bandwidth change reply message.

In another example, this disclosure is directed to a method for backhaul bandwidth management. The method comprises receiving a backhaul bandwidth change request message that includes a requested backhaul bandwidth level, calculating an available backhaul bandwidth level corresponding to a backhaul, and transmitting a backhaul bandwidth change acknowledgement message when the available backhaul bandwidth level supports the requested backhaul bandwidth level.

In another example, this disclosure is directed to an apparatus for backhaul bandwidth management. The apparatus comprises a backhaul bandwidth change request message receiving module configured to receive a backhaul bandwidth change request message that includes a requested backhaul bandwidth level, an available backhaul bandwidth level calculating module configured to calculate an available backhaul bandwidth level corresponding to a backhaul, and a message transmitting module configured to transmit a backhaul bandwidth change acknowledgement message when the available backhaul bandwidth level supports the requested backhaul bandwidth level.

In another example, this disclosure is directed to at least one machine readable medium for backhaul bandwidth management. The at least one machine readable medium may comprise a plurality of instructions that in response to being executed on a computing device, cause the computing device to receive a backhaul bandwidth change request message that includes a requested backhaul bandwidth level, calculate an available backhaul bandwidth level corresponding to a backhaul, and transmit a backhaul bandwidth change acknowledgement message when the available backhaul bandwidth level supports the requested backhaul bandwidth level.

DETAILED DESCRIPTION

Figure 1:
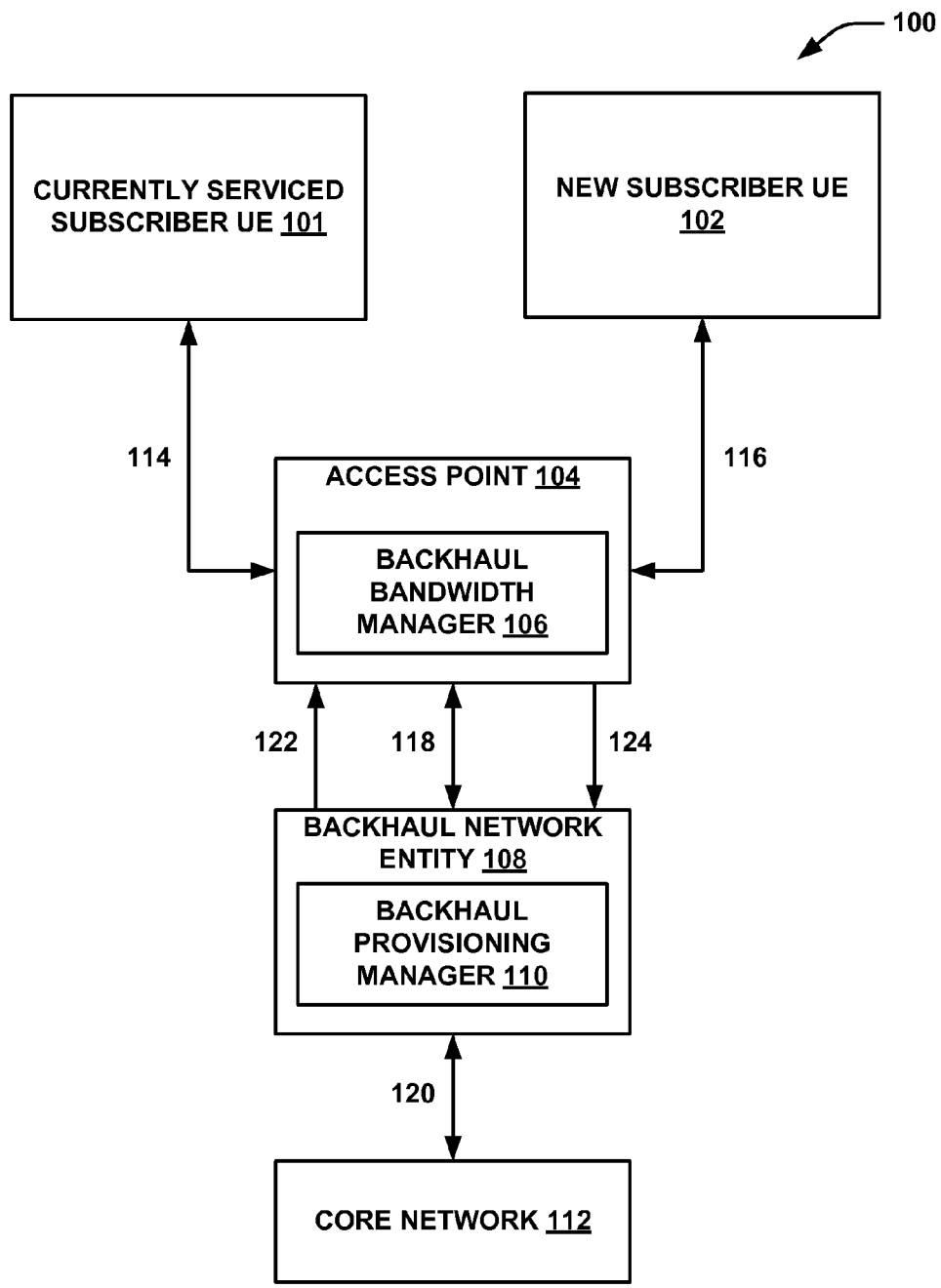
FIG. 1 is a schematic diagram illustrating an example system for dynamic backhaul bandwidth management, according to various techniques of this disclosure.

This disclosure provides methods and apparatuses for dynamic backhaul bandwidth management in a wireless network environment, which may include backhaul management methods performed by one or both of an access point and a backhaul management system (e.g. at a backhaul network entity, a core network entity, etc.).

The nature of a wired backhaul or core network (e.g. an Optical Access Network (OAN), such as a Passive Optical Network (PON) or Active Ethernet (AE), is significantly different than a Wireless Access Network (WAN) with respect to information carrying capacity. Both PON and AE possess constant capacity that does not vary over time, whereas Over-the-Air (OTA) links of WANs have a capacity that may vary considerably over time depending on factors such as path loss, fading, and interference between an access point and the user equipment.

WAN service providers generally respond to this varying OTA link capacity by conservatively provisioning the OAN associated with each access point of the WAN or by contracting with a backhaul provider for the theoretical maximum amount of CIR (Committed Information Rate) bandwidth required. In computing this theoretical maximum CIR bandwidth, the WAN service provider and/or the backhaul provider assume the maximum amount subscriber stations, all at maximum Channel Interference and Noise Ratio (CINR) with high Received Signal Strength Indicator (RSSI).

Furthermore, OAN networks support CIR and EIR (Excess Information Rate) types of bandwidth, with CIRs being guaranteed while but EIR rates are not guaranteed. In order for the OAN to meet the CIR rate guarantee, the sum of all of the provisioned CIR rates theoretically cannot be greater than minimum throughput of the OAN, which may be approximately 75% of the line rate. This effectively limits the number of access points, or Base Transceiver Stations (BTS), an OAN can support. This may (1) cause the backhaul provider to charge a higher rate for the CIR service, or (2) cause the WAN provider to install more OANs to support all of its access points.

In practice, however, typical throughputs are much lower than the maximum theoretical amount. Thus, for majority of the time, WAN service providers are paying for much more CIR bandwidth than they require or could function properly with fewer OANs.

Furthermore, WAN networks, unlike some other network types, have the ability to know how much bandwidth they require when a subscriber joins the network. Specifically the BTS can compute the efficiency of communication between each subscriber. If a subscriber is too far away from an access point to achieve a certain base throughput level (e.g. 50 Mbps), then there is no need to commit bandwidth for that level.

This information-carrying capacity in WiMAX is based on the Channel Quality Information Channel (CQICH) and is different for each subscriber. Also, each access point can also store and/or utilize the Quality of Service (QoS) and maximum committed information rates given to each subscriber UE. More specifically, each access point knows the subchannelization assignment to each subscriber UE, which is the maximum percentage of subcarriers that may be assigned to any particular subscriber UE based on the maximum transmit power and the path loss. This puts a cap on the maximum bandwidth from any one subscriber UE.

Thus, by utilizing methods and apparatuses of dynamic backhaul bandwidth provisioning presented herein, a WAN service provider may reduce the cost of the backhaul service and a backhaul service provider could increase its revenue by supporting more stations and/or WAN service providers because the provisioned rates would more closely reflect the actual needs of the WAN.

In some examples, an access point may determine that a potential subscriber load change exists, such as when an additional subscriber UE has requested service from the access point or when a currently serviced UE requests additional bandwidth, for example, due to a particular application, upload, or download, for example. Based on detecting this potential subscriber load change, the access point may generate and transmit a backhaul bandwidth change request to the backhaul network indicating the new backhaul bandwidth levels desired for the access point.

Upon receiving the backhaul bandwidth change request, the backhaul network may determine whether it can support the requested backhaul bandwidth change. If the backhaul network (e.g. at a backhaul network entity) determines that the backhaul has enough available bandwidth to support the request, the backhaul network may transmit a backhaul bandwidth change acknowledgement message to the access point that indicates that the request is granted. In some examples, the backhaul network may conversely determine that the backhaul network does not possess the requisite bandwidth to support the backhaul bandwidth requested and may send a denial message to the access point.

In some instances, however, the denial message may indicate not only that the backhaul network cannot support the full backhaul bandwidth level requested, but may also communicate an amount of service that it can support. Based on the denial message—whether it is an outright denial or a denial and a potential backhaul availability amount less than the amount requested—the access point may deny a service to the UE that necessitated the bandwidth change request or may redirect the UE to a different access point.

Turning to the figures, FIG. 1 is a schematic diagram illustrating a system 100 for dynamic backhaul bandwidth management, according to an example configuration. FIG. 1 includes an example access point 104, which may communicate wirelessly with one or more UEs, such as one or more currently serviced subscriber UEs 101 and/or one or more new subscriber UEs 102 over one or more wireless communication links 114 and 116, respectively. In an aspect, currently serviced subscriber UEs 101 may include UEs that have already established an ongoing wireless communication session with access point 104, but may request additional bandwidth corresponding to a backhaul 120, for example, to facilitate increased (or decreased) data transfer rates to and/or from a core network 112. In an aspect, backhaul 120 may comprise any communication line, including, but not limited to, one or more communication lines according to specifications promulgated by the Third Generation Partnership Project (3GPP) and/or 3GPP2, which may include first generation, second generation (2G), 3G, 4G, etc. wireless network architectures. Such communication lines may include communication interfaces such as, but not limited to, IuB, IuR, IuCS, Gn, Iu-h, S1-u, S1-MME, S11, S4, Gxc, Cx, Mj, Mg, Gn, Uu, LTE-Uu, etc.

Additionally, new subscriber UE 102 may comprise one or more UEs seeking to initiate a wireless communication session with access point 104 to obtain wireless services therefrom. In some examples, such wireless communication session initiation may include handoff (or handover), which may include, but is not limited to, hard handoff, soft handoff, or softer handoff, from an alternate access point (not shown) to access point 104.

In an aspect, one or more of currently serviced subscriber UEs 101 and new subscriber UEs 102 may be a mobile device, such as, but not limited to, a smartphone, cellular telephone, mobile phone, laptop computer, tablet computer, or other portable networked device. In addition, one or more of currently serviced subscriber UEs 101 and new subscriber UEs 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, one or more of currently serviced subscriber UEs 101 and new subscriber UEs 102 may be small and light enough to be considered portable and may be configured to communicate wirelessly via an over-the-air communication link using one or more OTA communication protocols described herein.

Furthermore, access point 104 of FIG. 1 may include one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, etc. Additionally, access point 104 may communicate with one or more other network entities of wireless and/or core networks. One example of such a network entity may include backhaul network entity 108, which may be configured to regulate backhaul bandwidth levels corresponding to one or more access points (e.g., access point 104) with which backhaul network entity is communicatively connected and for which backhaul network entity 108 controls provisioning via backhaul provisioning manager 110. Additionally, backhaul network entity 108 may communicate with one or more other network devices and/or may directly interface with core network 112.

Furthermore, in an aspect, access point 104 may include a backhaul bandwidth manager 106, which may be configured to generate and transmit one or more backhaul bandwidth change request messages 124, for example, to backhaul network entity 108, over communication link 118. In addition, backhaul network entity 108 may receive the one or more backhaul bandwidth change request messages 124. Based on receiving these one or more messages, backhaul provisioning manager may determine whether backhaul 120 has the available bandwidth necessary to provision the backhaul bandwidth requested in the one or more backhaul bandwidth request messages 124. Backhaul provisioning manager 110 may be configured to generate and transmit one or more backhaul bandwidth change reply messages 122, which may include an acknowledgement or a denial based on the amount of backhaul bandwidth available.

Additionally, system 100 and/or core network 112 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet.

Additionally, such network(s), which may include one or more access points 104, may comprise a Wideband Code Division Multiple Access (W-CDMA) system, and may communicate with one or more UEs (e.g., currently serviced subscriber UEs 101 and/or new subscriber UEs 102) according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g. currently serviced subscriber UEs 101, new subscriber UEs 102, access point 104, and/or backhaul network entity 108) may be coupled to the network(s) via one or more wired or wireless connections.

Figure 2:
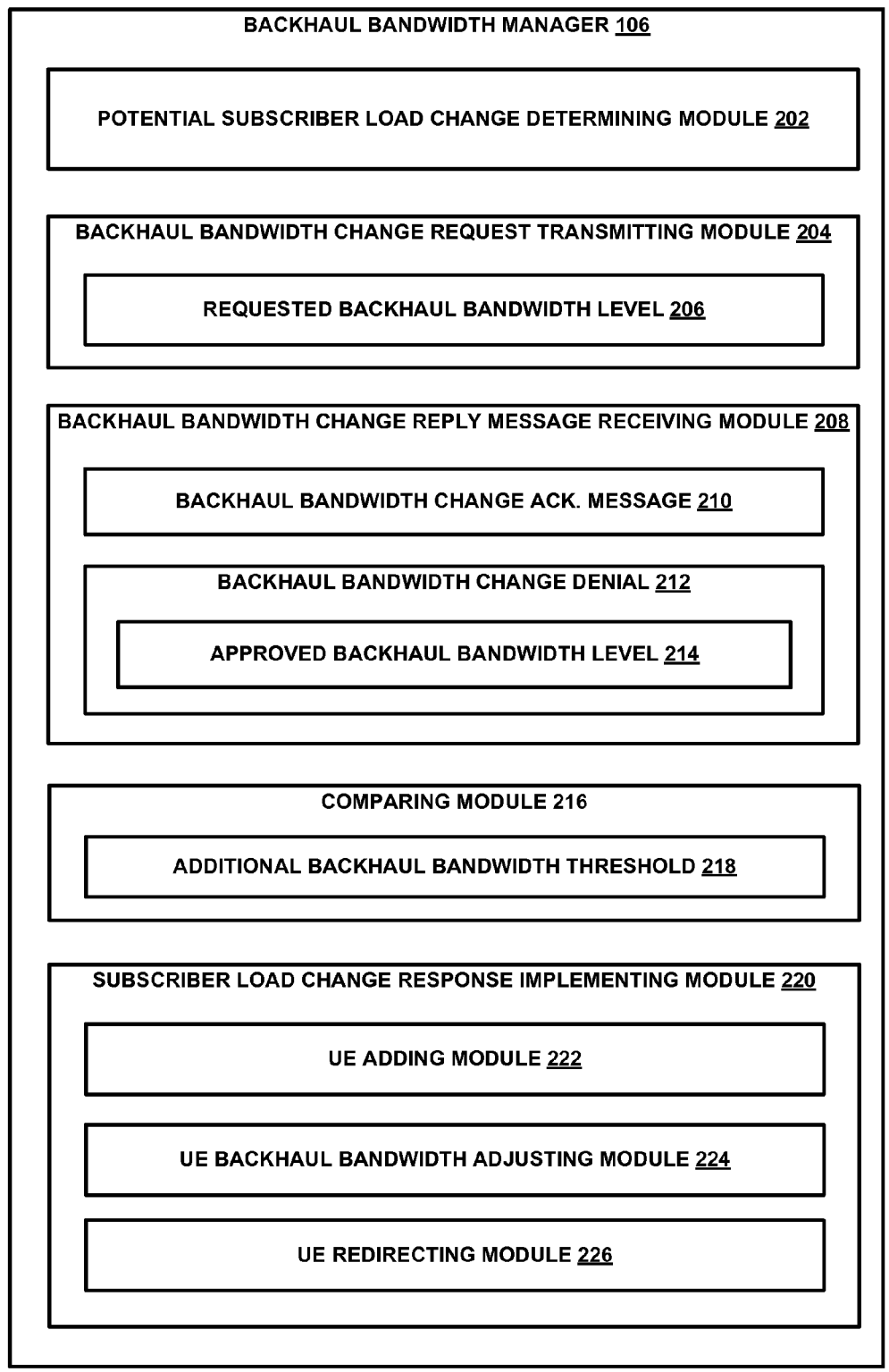
FIG. 2 is a block diagram illustrating an example access point bandwidth manager, according to various techniques of this disclosure.

FIG. 2 is a block diagram illustrating an example backhaul bandwidth manager 106 of access point 104 of FIG. 1, according to an example implementation, which may be configured to manage bandwidth needed for providing wireless service to one or more UEs (e.g. currently serviced subscriber UEs 101, new subscriber UEs 102 of FIG. 1). In an aspect, backhaul bandwidth manager 106 may include a potential subscriber load change determining module 202, which may be configured to determine a potential subscriber load change corresponding to an access point. For example, in some aspects, potential subscriber load change determining module 202 may determine a potential subscriber load change when an access point receives a request for additional bandwidth from a currently serviced subscriber module or when the access point receives a service request from a new UE, which may include a handover request.

Additionally, backhaul bandwidth manager 106 may include a backhaul bandwidth change request transmitting module 204, which may be configured to generate and transmit a backhaul bandwidth change request, for example, to a backhaul network entity, e.g., backhaul network entity 108 of FIG. 1.

In an aspect, the backhaul bandwidth change request may include a requested backhaul bandwidth level 206, which may correspond to an amount of additional bandwidth that would be necessary to facilitate the potential subscriber load change. Additionally or alternatively, requested backhaul bandwidth level 206 may correspond to a backhaul level corresponding to a class of service to which the request is directed. Several classes of service exist in mobile communication networks, each of which is defined by the type of service being rendered and the corresponding throughput requirements for the type of service. Non-limiting example classes of service may include: (1) synchronization traffic (~0.5 Mbits/sec); (2) voice and control traffic (~3.5 Mbits/sec); (3) streaming media (~6 Mbits/sec); and interactive (40 MBits/sec). Thus, in some examples, requested backhaul bandwidth level 206 may correspond to a desired bandwidth level for one or more classes of service.

In addition, backhaul bandwidth manager 106 may include a backhaul bandwidth change reply message receiving module 208, which may be configured to receive one or more backhaul bandwidth change reply messages from, for example, a backhaul network entity (e.g., backhaul network entity 108 of FIG. 1). In an aspect, such a backhaul bandwidth change reply message may include one or both of a backhaul bandwidth change acknowledgement message 210 and a backhaul bandwidth change denial 212.

In an aspect, backhaul bandwidth change reply message receiving module 208 may determine that a requested backhaul bandwidth level 206 has been acknowledged, accepted, and/or provisioned based on receiving a backhaul bandwidth change acknowledgement message 210. Additionally, backhaul bandwidth change reply message receiving module 208 may determine that a requested backhaul bandwidth level 206 has been denied based on receiving a backhaul bandwidth change denial 212. Based on this denial, the access point may redirect a potentially new subscriber UE to an alternative access point or may deny a bandwidth increase request from a requesting application on a currently serviced subscriber UE.

Alternatively, the backhaul bandwidth change denial may include an approved backhaul bandwidth level, which may be less than the requested backhaul bandwidth level. Based on receiving the approved backhaul bandwidth level 214, comparing module 216 may determine whether the approved backhaul bandwidth level 214 meets an additional backhaul bandwidth threshold 218, which may comprise a minimum acceptable level for additional bandwidth required for the backhaul bandwidth change request.

Furthermore, backhaul bandwidth manager 106 may include a subscriber load change response implementing module 220, which may be configured to implement a load change response corresponding to a potential subscriber load change. For example, subscriber load change response implementing module 220 may include a UE adding module 222, which may be configured to add a UE (e.g. a new subscriber UE 102 of FIG. 1) to a set of UEs serviced by an access point. Furthermore, subscriber load change response implementing module 220 may include a UE backhaul bandwidth adjusting module 224, which may be configured to dynamically adjust a backhaul bandwidth corresponding to the access point as a whole or for a currently serviced subscriber UE (e.g., currently serviced subscriber UE 101 of FIG. 1).

In addition, subscriber load change response implementing module 220 may include a UE redirecting module 226, which may be configured to redirect a UE (e.g., a new subscriber UE 102 of FIG. 1) to an alternate access point. For example, UE redirecting module 226 may redirect a UE based on backhaul bandwidth change reply message receiving module 208 receiving a backhaul bandwidth change denial 212 without an accompanying approved backhaul bandwidth level 214, or based on backhaul bandwidth change reply message receiving module 208 receiving a backhaul bandwidth change denial 212 with an accompanying approved backhaul bandwidth level 214 that does not meet (e.g. is less than or is less than or equal to, in some examples) an additional backhaul bandwidth threshold 218.

Figure 3:
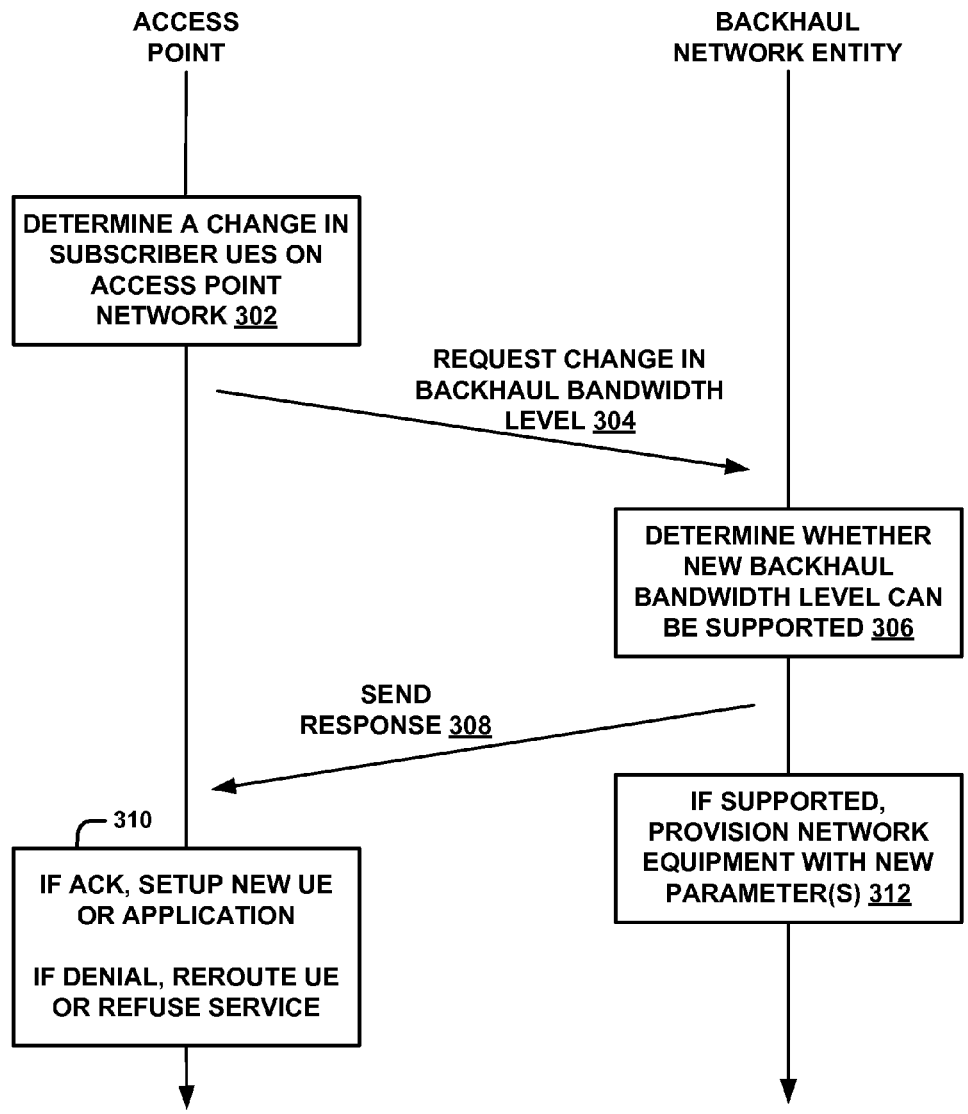
FIG. 3 is a message flow diagram illustrating an example method and message flow for dynamic backhaul bandwidth management at an access point, according to various techniques of this disclosure.

FIG. 3 is a message flow diagram illustrating an example message flow and method for dynamic backhaul provisioning according to the present disclosure. In an aspect, this dynamic backhaul provisioning may involve a Dynamic Service Level Agreement (SLA) protocol, which could serve as a management protocol between one or more access points and a backhaul network entity, which may include a backhaul management system, and potentially further into a core network. This Dynamic SLA protocol could operate in such a way that it would not only allow an access point and backhaul network entity to communicate to establish a connection per se, but also to adjust service levels on existing connections.

Using the Dynamic SLA, the WAN service provider could establish an agreement with a backhaul provider on the number of connections, Virtual Large Area Network (VLAN) tags used, the minimum and maximum bounds of CIR, EIR, Cellular Backhaul Switching (CBS), etc. From there, as subscribers entered or left the WAN network, or changed the type of services they were using, the access point could transmit a SLA change request to the backhaul network indicating the new levels desired.

For example, in reference to FIG. 3, at block 302, the access point may determine a change in one or more subscriber UEs on the network of the access point (e.g. the WAN). This change may include potentially adding a UE or increasing bandwidth associated with a currently serviced UE that may wish to add bandwidth (e.g. to facilitate functionality of an application running on the UE). In an aspect, the UE may wish to add bandwidth to facilitate adequate or improved functionality of one or more classes of service. Based on determining this change, the access point may dynamically request, at 304, a corresponding change in a backhaul bandwidth level associated with the access point, one or more of its UEs, or one or more classes of service associated therewith.

The backhaul network entity may then determine, at block 306, whether it can support the SLA change from the request. It may then send a response to the access point at 308. If the backhaul network entity can support the SLA change, the response may constitute an acknowledgement to the access point and the backhaul network entity can configure various network elements with the new settings at block 312 and may record the start and end time of settings change. These start and end times may be used to determine how long a particular setting has been used and the WAN service provider charged appropriately based on their agreement.

Alternatively, if the backhaul network cannot support the SLA change, the message of 308 may constitute a non-acknowledgement (NACK), which may potentially include the amount of service the backhaul can support. The access point can in turn refuse the service from the subscriber or re-direct the subscriber to a different BTS at block 310.

By way of a specific and non-limiting example of the message flow of FIG. 3, assume that a currently serviced subscriber UE determines that an increase in throughput rate from 10 Mbits/sec to 15 Mbits/sec is desirable, for example, for a particular class of service (e.g. streaming video or audio). The UE may indicate the requested increase throughput rate in a message (not shown), which the access point may use to determine, at block 302, that a throughput change is desired by one of its UEs. In an aspect, the access point (or a component therein) may generate a message that includes an indication that more backhaul bandwidth is requested, for example, for the particular class of service. Furthermore, the message may include additional backhaul bandwidth amount requested, which may be an absolute bandwidth amount or an amount of increase from a current bandwidth amount. For example, as above, where a UE determines that an increase in throughput rate from 10 Mbits/sec to 15 Mbits/sec is desirable, the additional backhaul bandwidth amount in the request message may be 15 Mbits/sec where the request format is an absolute bandwidth amount or may be 5 Mbits/sec where the request format is an amount of increase (i.e. differential) format. Additionally, the UE may transmit the message to the backhaul network entity at 304.

The backhaul network entity may receive the request message and extract the desired backhaul increase level (here, 5 Mbits/sec). Thereafter, the backhaul network entity may determine that it can provision an additional 3 Mbits/sec, but not the 5 Mbits/sec requested by the access point (and originally requested by the UE). In response, the backhaul network entity generates and transmits a NACK message as a response at 308 to the access point that indicates that the full 5 Mbits/sec are not available, but 3 Mbits/sec are available. Based on this information, the access point can reroute the requesting UE to a different access point, approve the 3 Mbit/sec amount via a response message to the backhaul network entity, or can refuse the UE request entirely.

Figure 4:
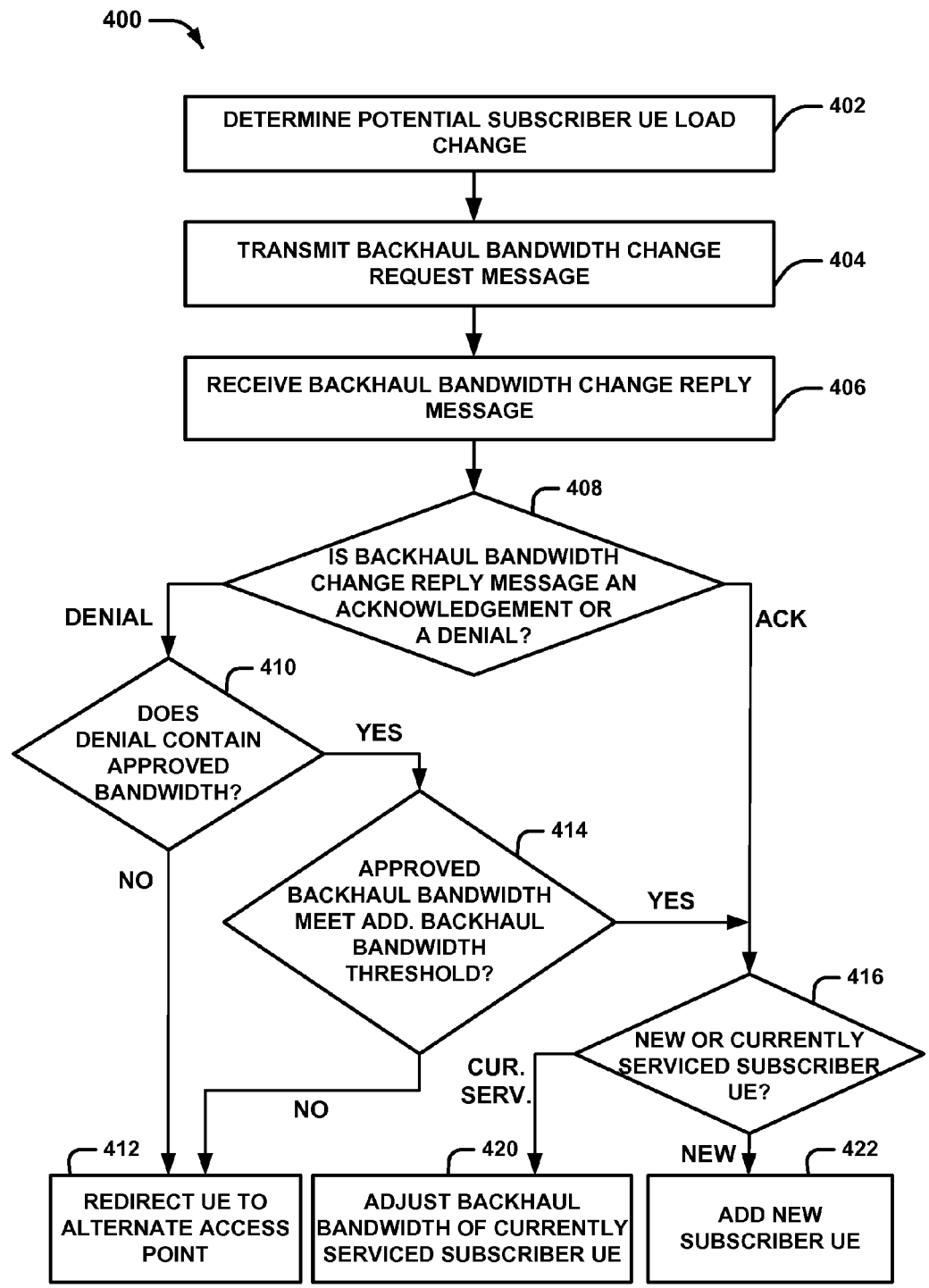
FIG. 4 is a flowchart illustrating an example method for dynamic backhaul bandwidth management at an access point, according to various techniques of this disclosure.

FIG. 4 is a flowchart illustrating an example method 400 for improved and dynamic backhaul bandwidth management in wireless networks. In an aspect, the example method 400 may include, at block 402, determining that a potential subscriber UE load change exists. For example, a potential subscriber load change may exist when an access point receives a request for additional bandwidth from a currently serviced subscriber module or when the access point receives a service request from a new UE, which may include a handover request. In addition, at block 404, method 400 may include transmitting a backhaul bandwidth change request message. In an aspect, the backhaul bandwidth change request message may include a requested bandwidth change level corresponding to the request.

Moreover, at block 406, method 400 may include receiving a bandwidth change reply message, for example, from a backhaul network entity (e.g., backhaul network entity 108 of FIG. 1). In an aspect, the backhaul bandwidth change reply message may be an acknowledgement or a denial. Thus, in some examples, method 400 may include determining whether the backhaul bandwidth change reply message is a backhaul bandwidth change acknowledgement or a backhaul bandwidth change denial at block 408.

Further, when the backhaul bandwidth change reply message is a denial at block 408, method 400 may further determine whether the denial contains an approved backhaul bandwidth level at block 410. In an aspect, the approved backhaul bandwidth level may comprise an absolute bandwidth level increase value or a differential bandwidth level increase that the backhaul can support (e.g in the example above, the absolute approved bandwidth increase may be 13 Mbits/sec, whereas a corresponding differential bandwidth level increase value may be 3 Mbits/sec in the example). When the denial does not contain an approved bandwidth level ("NO" branch of block 410), method 400 may proceed to block 412, which may include redirecting a UE to an alternate access point. In an aspect, the alternate access point may comprise a different access point of the same network as the access point currently serving the UE, but may also be an access point of another network (e.g. a WiFi or small cell network). However, in an alternative aspect of method 400, when the denial contains an approved bandwidth at block 410 ("YES" branch of block 410), method 400 may further include determining whether the approved backhaul bandwidth meets an additional backhaul bandwidth threshold at block 414. In an aspect, block 414 may include comparing the additional backhaul bandwidth threshold to the approved backhaul bandwidth. In an aspect, when the approved backhaul bandwidth does not meet the additional backhaul bandwidth threshold of block 414, method 400 may include redirecting a UE to an alternate access point.

In addition, when the backhaul bandwidth change reply message is an acknowledgement at block 408 and/or when the approved backhaul bandwidth meets the additional backhaul bandwidth threshold at block 414, method 400 may further include determining whether the potential subscriber UE load change (see block 402) is corresponding to a new subscriber UE or a currently serviced UE. In an aspect, when the potential subscriber UE load change request is corresponding to a currently serviced UE at block 416, method 400 may include adjusting the backhaul bandwidth of a currently serviced subscriber UE at block 420 (e.g. initiating a process or application necessitating the potential subscriber UE load change). Alternatively, when the potential subscriber UE load change request is corresponding to a new UE at block 416, method 400 may include adding a new subscriber UE at block 422.

Figure 5:
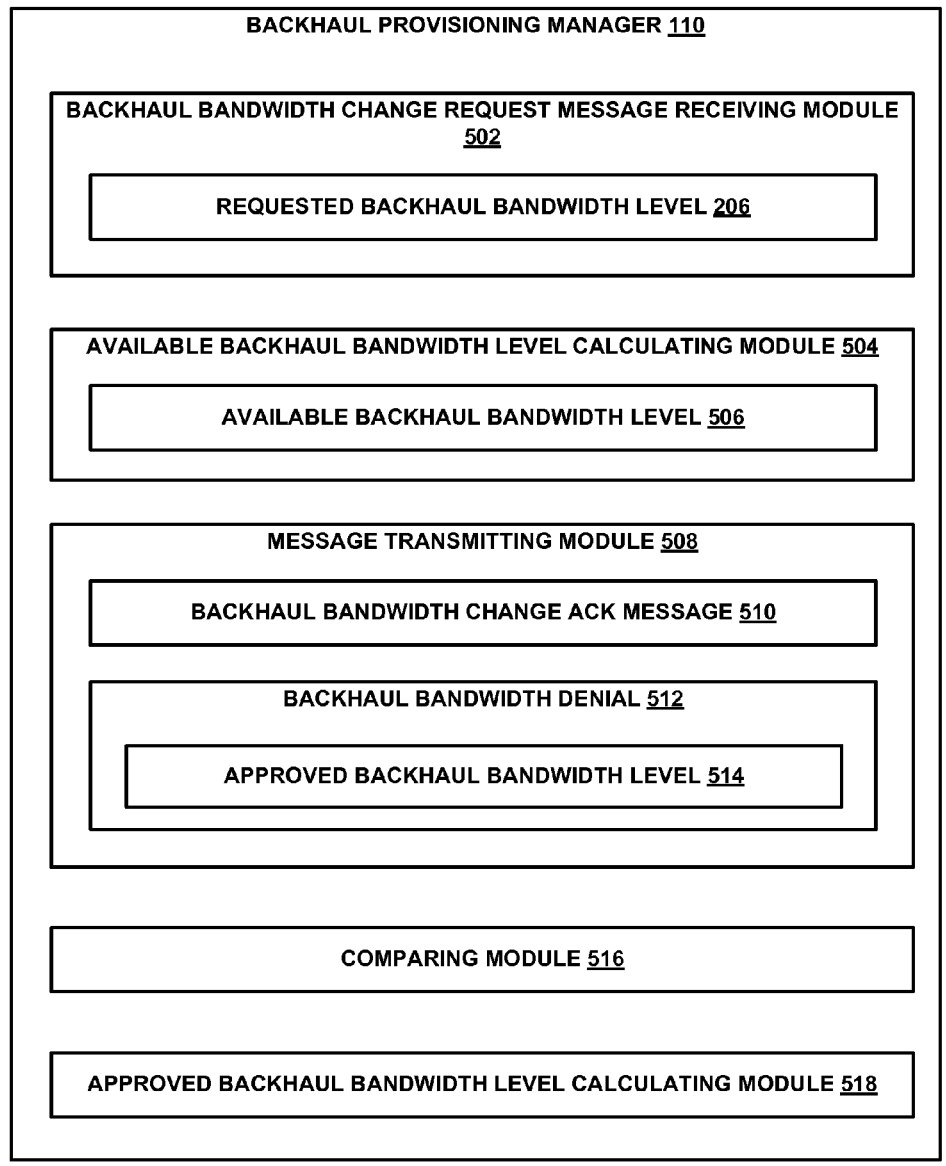
FIG. 5 is a block diagram illustrating an example backhaul provisioning manager, according to various techniques of this disclosure.

FIG. 5 is a block diagram illustrating an example backhaul provisioning manager 110 of backhaul network entity 108 of FIG. 1, which may be configured to manage backhaul bandwidth requests from one or more access points and to provision backhaul bandwidth based on the bandwidth available. For example, backhaul provisioning manager 110 may include a backhaul bandwidth change request message receiving module 502, which may be configured to receive one or more backhaul bandwidth change request messages from one or more access points controlled by the backhaul network entity. In an aspect, the one or more backhaul bandwidth change request messages may each contain a requested backhaul bandwidth level 206.

In addition, the backhaul provisioning manager 110 may include an available backhaul bandwidth level calculating module 504, which may be configured to calculate, obtain, or otherwise determine an available backhaul bandwidth level 506 corresponding to the backhaul. Furthermore, backhaul provisioning manager 110 may include a message transmitting module 508, which may be configured to transmit one or more messages to one or more access points under control of the backhaul network entity. For example, message transmitting module 508 may be configured to generate and transmit a backhaul bandwidth change acknowledgement message 510 and/or a backhaul bandwidth denial 512. In an aspect, such a backhaul bandwidth denial 512 may include an approved backhaul bandwidth level.

Furthermore, to determine whether backhaul provisioning manager will generate and transmit a backhaul bandwidth change acknowledgement message 510 or a backhaul bandwidth denial 512, and whether a backhaul bandwidth denial 512 will constitute an outright denial or will include an approved backhaul bandwidth level 514, backhaul provisioning manager 110 may include a comparing module 516. In some examples, comparing module 516 may be configured to compare the requested backhaul bandwidth level 206 to the available backhaul bandwidth level 506.

In an aspect, when the available backhaul bandwidth level 506 is greater than or equal to the requested backhaul bandwidth level 206, message transmitting module 508 may be configured to generate and/or transmit a backhaul bandwidth change acknowledgement message 510 and may provision one or more network entities to provision such requested bandwidth. Alternatively, when comparing module 516 determines that available backhaul bandwidth level 506 is less than requested backhaul bandwidth level 206, approved backhaul bandwidth level calculating module 518 may set approved backhaul bandwidth level 514 to the available backhaul bandwidth level. Message transmitting module may thus be configured to transmit a backhaul bandwidth denial 512 with the approved backhaul bandwidth level or without this level. Thereafter, backhaul provisioning manager may receive an indication from an access point as to whether the access point requests that the approved backhaul bandwidth level be provisioned for the approved backhaul bandwidth level 514. In such an instance, backhaul provisioning manager 110 may provision one or more network entities to allocate the bandwidth to the access point.

Figure 6:
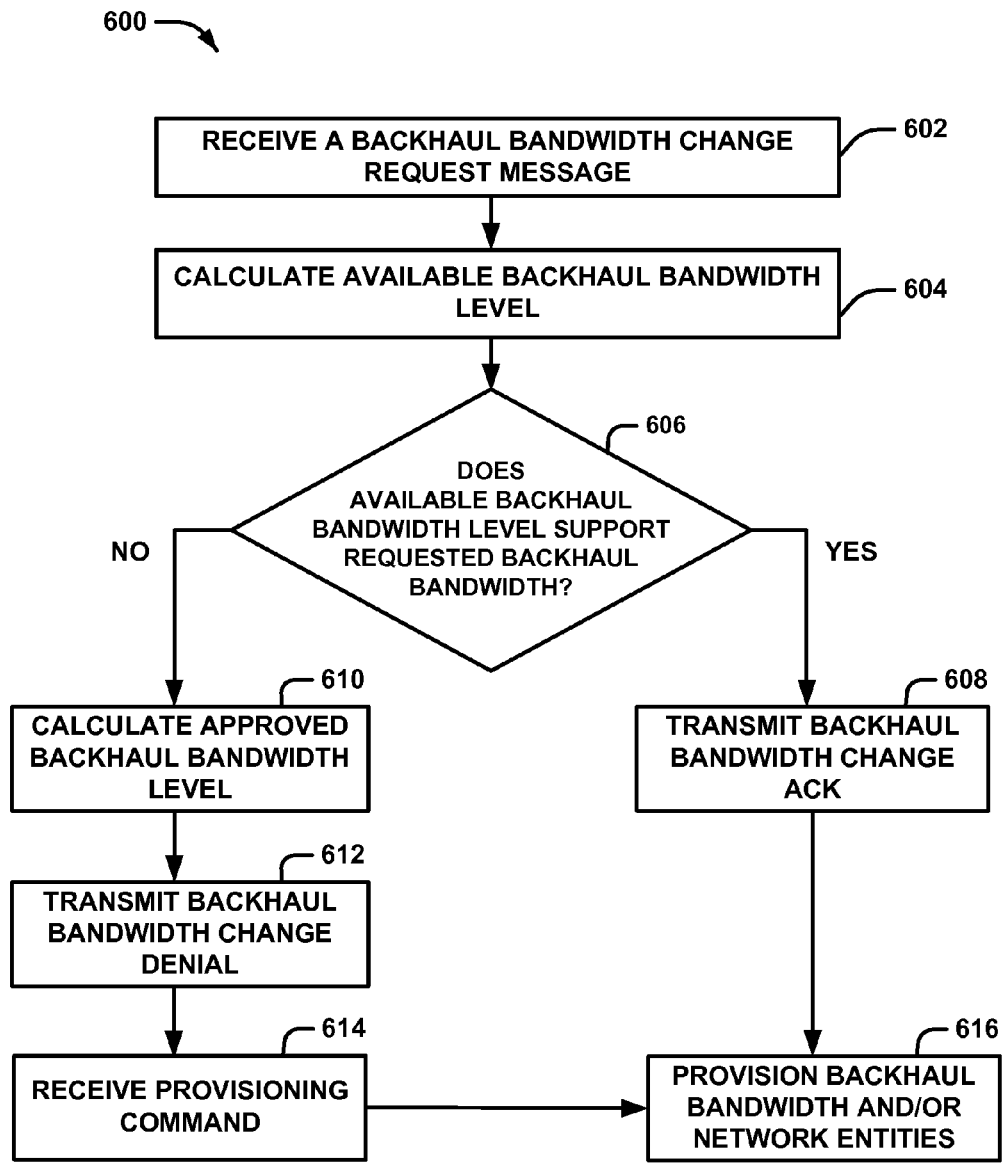
FIG. 6 is a flowchart illustrating an example method for dynamic backhaul bandwidth management at backhaul network entity, according to various techniques of this disclosure.

FIG. 6 is a flowchart illustrating an example method 600 for improved and dynamic backhaul bandwidth management in wireless networks. In an aspect, the example method 600 may include, at block 602, receiving a backhaul bandwidth change request message from an access point. Additionally, at block 604, method 600 may include calculating an available backhaul bandwidth level 604. Further, at block 606, method 600 may include determining whether an available backhaul bandwidth level corresponding to a backhaul link supports the requested backhaul bandwidth.

In an aspect, when the available backhaul bandwidth level supports the requested backhaul bandwidth at block 606, method 600 may further include transmitting a backhaul bandwidth change acknowledgement message, for example, to a requesting access point at block 608. In an additional aspect, when the available backhaul bandwidth level does not support the requested backhaul bandwidth at block 606, method 600 may include calculating an approved backhaul bandwidth level, which may be the available backhaul bandwidth level, but may also include another amount depending on other network conditions or requests. Furthermore, method 600 may include transmitting a backhaul bandwidth change denial to a requesting access point at block 612, which may or may not include an approved backhaul bandwidth level. Further, at block 616, method 600 may include provisioning backhaul bandwidth (e.g. via network entities) to the requesting access point.

In an aspect, the amount of backhaul bandwidth provisioned may be based on determining that the available backhaul bandwidth level supports the requested backhaul bandwidth and transmitting a backhaul bandwidth change acknowledgement at block 608. Alternatively, the method 600 may include provisioning backhaul bandwidth based on receiving a provisioning command corresponding to receiving an approved backhaul bandwidth level acknowledgement message from the access point at block 614. In such an approved backhaul bandwidth level acknowledgement message may indicate that the access point requests that the approved backhaul bandwidth be provisioned regardless of the fact that the approved backhaul bandwidth is less than the requested backhaul bandwidth change at block 602.

Figure 7:
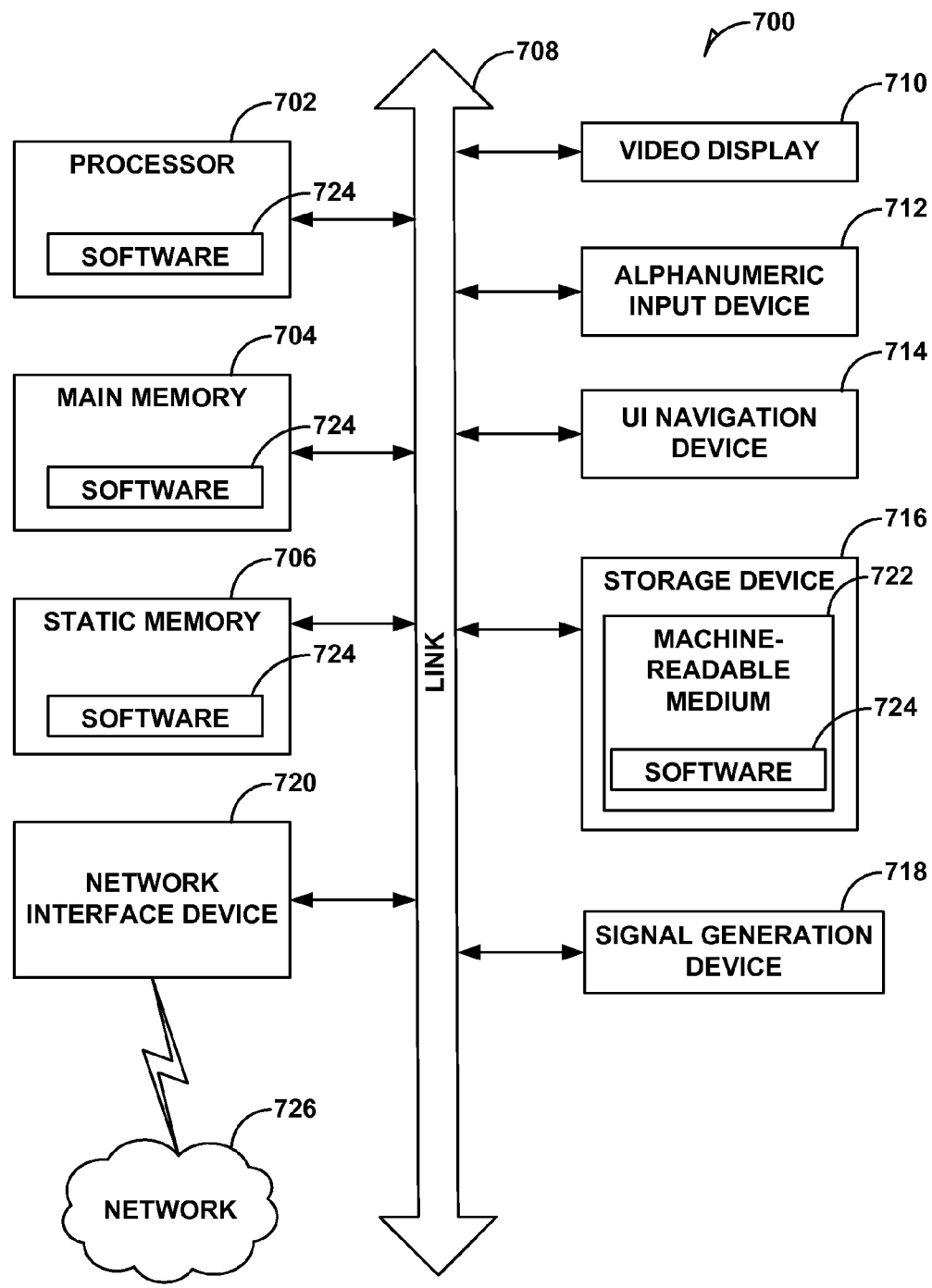
FIG. 7 is a block diagram illustrating an example machine in the example form of a computer system, within which a set or sequence of instructions for causing the machine to perform any one of the methodologies discussed herein may be executed, according to various techniques of this disclosure.

FIG. 7 is a block diagram illustrating a machine in the example form of a computer system 700, within which a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g. a central processing unit (CPU), a graphics processing unit (GPU) or both, processor cores, computer nodes, etc.), a main memory 704 and a static memory 706, which communicate with each other via a link 708 (e.g. bus). The computer system 700 may further include a video display unit 710, an alphanumeric input device 712 (e.g. a keyboard), and a user interface (UI) navigation device 714 (e.g. a mouse). In one embodiment, the video display unit 710, input device 712 and UI navigation device 714 are incorporated into a touch screen display. The computer system 700 may additionally include a storage device 716 (e.g. a drive unit), a signal generation device 718 (e.g. a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g. software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g. a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or corresponding to such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "module" and "module" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, when the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Additional Notes & Examples

Example 1 may include subject matter (such as an apparatus, mobile apparatus, user equipment, network device, communication apparatus or device, hardware, module, or module) comprising a potential subscriber load change determining module configured to determine a potential subscriber UE load change, a backhaul bandwidth change request transmitting module configured to transmit a backhaul bandwidth change request message based a potential subscriber UE load change, wherein the backhaul bandwidth change request message includes a requested backhaul bandwidth level, a backhaul bandwidth change reply message receiving module configured to receive a backhaul bandwidth change reply message in response to transmitting the backhaul bandwidth change request message, and a subscriber load change response implementing module configured to implement a subscriber UE load change response corresponding to the potential subscriber UE load change based on receiving the backhaul bandwidth change reply message.

Example 2 may include the subject matter of Example 1, wherein the backhaul bandwidth change reply message receiving module is further configured to receive a backhaul bandwidth change acknowledgement message.

Example 3 may include the subject matter of either of Example 1 or Example 2, wherein the subscriber load change response implementing module comprises a UE backhaul bandwidth adjusting module configured to adjust a provisioned backhaul bandwidth corresponding to a currently serviced subscriber UE.

Example 4 may include subject matter (such as a method, means for performing acts, machine readable medium including instructions that, when performed by a machine cause the machine to performs acts, or an apparatus configured to perform), which may optionally be in addition to any one or combination of Examples 1-3, comprising determining a potential subscriber UE load change, transmitting a backhaul bandwidth change request message based a potential subscriber UE load change, wherein the backhaul bandwidth change request message includes a requested backhaul bandwidth level, receiving a backhaul bandwidth change reply message in response to transmitting the backhaul bandwidth change request message, and implementing a subscriber UE load change response corresponding to the potential subscriber UE load change based on receiving the backhaul bandwidth change reply message.

Example 5 can include, or can optionally be combined with the subject matter of Example 4, to optionally include receiving the backhaul bandwidth change reply message comprises receiving a backhaul bandwidth change acknowledgement message.

Example 6 can include, or can optionally be combined with the subject matter of one or any combination of Examples 4 and 5 to optionally include adding a new subscriber UE.

Example 7 can include the subject matter of one or any combination of Examples 4 through 6, to optionally include adjusting a provisioned backhaul bandwidth corresponding to a currently serviced subscriber UE.

Example 8 can include, or can optionally be combined with the subject matter of one or any combination of Examples 4 through 7, to optionally include receiving a backhaul bandwidth change denial.

Example 9 can include, or can optionally be combined with the subject matter of one or any combination of Examples 4 through 8, to optionally include redirecting a UE to an alternate access point.

Example 10 can include the subject matter of one or any combination of Examples 4 through 8, wherein the backhaul bandwidth change denial includes an approved backhaul bandwidth level.

Example 11 can include, or can optionally be combined with the subject matter of one or any combination of Examples 4 through 10, to optionally include determining whether the approved backhaul bandwidth level meets an additional backhaul bandwidth threshold.

Example 12 can include, or can optionally be combined with the subject matter of one or any combination of Examples 4 through 11, to optionally include redirecting a UE to an alternate access point upon determining that the approved backhaul bandwidth level fails to meet the additional backhaul bandwidth threshold.

Example 13 can include, or can optionally be combined with the subject matter of one or any combination of Examples 4 through 12, to optionally include adjusting a provisioned backhaul bandwidth corresponding to a currently serviced subscriber UE to the approved backhaul bandwidth level upon determining that the approved backhaul bandwidth level meets the additional backhaul bandwidth threshold.

Example 14 can include, or can optionally be combined with the subject matter of one or any combination of Examples 4 through 13, to optionally include adding a new subscriber UE upon determining that the approved backhaul bandwidth level meets the additional backhaul bandwidth threshold.

Example 15 may include subject matter (such as an apparatus, mobile apparatus, user equipment, network device, communication apparatus or device, hardware, module, or module), which may optionally be in addition to any one or combination of Examples 1-14, comprising a backhaul bandwidth change request message receiving module configured to receive a backhaul bandwidth change request message, wherein the backhaul bandwidth change request message includes a requested backhaul bandwidth level, an available backhaul bandwidth level calculating module configured to calculate an available backhaul bandwidth level corresponding to a backhaul, and a message transmitting module configured to transmit a backhaul bandwidth change acknowledgement message when the available backhaul bandwidth level supports the requested backhaul bandwidth level.

Example 16 can include the subject matter of Example 15, wherein the backhaul bandwidth change acknowledgement message includes an approved backhaul bandwidth level.

Example 17 can include the subject matter of one or both of Example 15 and Example 16, wherein the approved backhaul bandwidth level equals the requested backhaul bandwidth level.

Example 18 can include, or can optionally be combined with the subject matter of one or any combination of Examples 15 through 17, to optionally include a comparing module configured to determine that the available backhaul bandwidth level does not support the requested backhaul bandwidth level, and an approved backhaul bandwidth level calculating module configured to calculate an approved backhaul bandwidth level based on the available backhaul bandwidth level, wherein the approved backhaul bandwidth level is less than the requested backhaul bandwidth level; and wherein the message transmitting module is further configured to transmit a backhaul bandwidth change denial based on determining that the available backhaul bandwidth level does not support the requested backhaul bandwidth level, wherein the backhaul bandwidth change denial includes the approved backhaul bandwidth level.

Example 19 may include subject matter (such as a method, means for performing acts, machine readable medium including instructions that, when performed by a machine cause the machine to performs acts, or an apparatus configured to perform), which may optionally be in addition to any one or combination of Examples 1-18, comprising receiving a backhaul bandwidth change request message, wherein the backhaul bandwidth change request message includes a requested backhaul bandwidth level, calculating an available backhaul bandwidth level corresponding to a backhaul, and transmitting a backhaul bandwidth change acknowledgement message when the available backhaul bandwidth level supports the requested backhaul bandwidth level.

Example 20 can include the subject matter of Example 19, wherein the backhaul bandwidth change acknowledgement message includes an approved backhaul bandwidth level.

Example 21 can include the subject matter of one or both of Examples 19 and 20, wherein the approved backhaul bandwidth level equals the requested backhaul bandwidth level.

Example 18 can include, or can optionally be combined with the subject matter of one or any combination of Examples 19 through 21, to optionally include determining that the available backhaul bandwidth level does not support the requested backhaul bandwidth level, calculating an approved backhaul bandwidth level based on the available backhaul bandwidth level, wherein the approved backhaul bandwidth level is less than the requested backhaul bandwidth level, transmitting a backhaul bandwidth change denial based on determining that the available backhaul bandwidth level does not support the requested backhaul bandwidth level, wherein the backhaul bandwidth change denial includes the approved backhaul bandwidth level.

What is claimed is:

1. A method of backhaul bandwidth management executed by an access point located in an access network, the method comprising: determining, with the access point, a potential mobile subscriber user equipment (UE) load change; transmitting, from the access point to a backhaul network entity, a backhaul bandwidth change request message based on determining the potential mobile subscriber UE load change, wherein the backhaul bandwidth change request message includes a requested backhaul bandwidth level; receiving, with the access point, a backhaul bandwidth change reply message from the backhaul network entity in response to transmitting the backhaul bandwidth change request message; and implementing, with the access point, a mobile subscriber UE load change response, comprising adjusting backhaul bandwidth of the mobile subscriber UE, corresponding to the potential mobile subscriber UE load change based on receiving the backhaul bandwidth change reply message.

2. The method of claim 1, wherein receiving the backhaul bandwidth change reply message comprises receiving a backhaul bandwidth change acknowledgement message.

3. The method of claim 2, wherein implementing the subscriber UE load change response comprises adding a new subscriber UE.

4. The method of claim 2, wherein implementing the subscriber UE load change response comprises adjusting a provisioned backhaul bandwidth corresponding to a currently serviced subscriber UE.

5. The method of claim 1, wherein receiving the backhaul bandwidth change reply message comprises receiving a backhaul bandwidth change denial message.

6. The method of claim 5, wherein implementing the subscriber UE load change response comprises redirecting a UE to an alternate access point.

7. The method of claim 5, wherein the backhaul bandwidth change denial message includes an approved backhaul bandwidth level.

8. The method of claim 5, further comprising determining whether the approved backhaul bandwidth level meets an additional backhaul bandwidth threshold.

9. The method of claim 8, wherein implementing the subscriber UE load change response comprises redirecting a UE to an alternate access point upon determining that the approved backhaul bandwidth level fails to meet the additional backhaul bandwidth threshold.

10. The method of claim 8, wherein implementing the subscriber UE load change response comprises adjusting a provisioned backhaul bandwidth corresponding to a currently serviced subscriber UE to the approved backhaul bandwidth level upon determining that the approved backhaul bandwidth level meets the additional backhaul bandwidth threshold.

11. The method of claim 8, wherein implementing the subscriber UE load change response comprises adding a new subscriber UTE upon determining that the approved backhaul bandwidth level meets the additional backhaul bandwidth threshold.

12. An apparatus for backhaul bandwidth management, comprising: an access point configured to located in an access network, the access point including: a potential subscriber load change determining module configured to determine a potential mobile subscriber user equipment (UE) load change; a backhaul bandwidth change request transmitting module configured to transmit a backhaul bandwidth change request message to a backhaul network entity based on determining the potential mobile subscriber UE load change, wherein the backhaul bandwidth change request message includes a requested backhaul bandwidth level; a backhaul bandwidth change reply message receiving module configured to receive a backhaul bandwidth change reply message from a backhaul network entity in response to transmitting the backhaul bandwidth change request message; and a subscriber load change response implementing module configured to implement a mobile subscriber UE load change response, comprising adjusting backhaul bandwidth of the mobile subscriber UE, corresponding to the potential mobile subscriber UE load change based on receiving the backhaul bandwidth change reply message.

13. The apparatus of claim 12, wherein the backhaul bandwidth change reply message receiving module is further configured to receive a backhaul bandwidth change acknowledgement message.

14. The apparatus of claim 13, wherein the subscriber load change response implementing module comprises a UE backhaul bandwidth adjusting module configured to adjust a provisioned backhaul bandwidth corresponding to a currently serviced subscriber UE.

15. At least one non-transitory machine readable medium comprising a plurality of instructions that in response to being executed on a computing device, cause the computing device to: determine, with an access point, a potential mobile subscriber user equipment (UE) load change; transmit, from the access point to a backhaul network entity, a backhaul bandwidth change request message based on determining the potential mobile subscriber UE load change, wherein the backhaul bandwidth change request message includes a requested backhaul bandwidth level: receive, with the access point, a backhaul bandwidth change reply message in response to transmitting the backhaul bandwidth change request message; and implement, with the access point, a mobile subscriber UE load change response, comprising adjusting backhaul bandwidth of the mobile subscriber UE, corresponding to the potential mobile subscriber UE load change based on receiving the backhaul bandwidth change reply message.

16. The at least one machine readable medium of claim 15, further comprising a plurality of instructions that in response to being executed on a computing device, cause the computing device to receive a backhaul bandwidth change acknowledgement message.

17. The at least one machine readable medium of claim 16, further comprising a plurality of instructions that in response to being executed on a computing device, cause the computing device to adjust a provisioned backhaul bandwidth corresponding to a currently serviced subscriber UE.

* * * * *